United States Patent [19]
Griffiths

[11] Patent Number: 6,107,785
[45] Date of Patent: Aug. 22, 2000

[54] POLYPHASE STATIC VAR COMPENSATOR ARRANGEMENT FOR SUPPLY VOLTAGE REGULATION BY ENERGY DISSIPATION

[75] Inventor: Peter T Griffiths, Ruse, Australia

[73] Assignee: GEC Alsthom Limited, United Kingdom

[21] Appl. No.: 09/077,281
[22] PCT Filed: Nov. 27, 1996
[86] PCT No.: PCT/GB96/02912
§ 371 Date: Jul. 28, 1998
§ 102(e) Date: Jul. 28, 1998
[87] PCT Pub. No.: WO97/20374
PCT Pub. Date: Jun. 5, 1997

[30] Foreign Application Priority Data
Nov. 28, 1995 [GB] United Kingdom ............... 9524253

[51] Int. Cl.$^7$ .................................................. H02J 3/18
[52] U.S. Cl. ............................................................ 323/209
[58] Field of Search .................................. 323/205, 208, 323/209, 210, 211

[56] References Cited

U.S. PATENT DOCUMENTS

| | | | |
|---|---|---|---|
| 4,353,024 | 10/1982 | Gyugyi | 323/211 |
| 4,371,829 | 2/1983 | Salowe et al. | |
| 4,475,139 | 10/1984 | Chadwick | 361/91 |
| 4,567,424 | 1/1986 | Dobsa et al. | |
| 4,571,535 | 2/1986 | Gyugyi | 323/211 |
| 5,093,630 | 3/1992 | Sato | 323/210 |
| 5,309,346 | 5/1994 | Guygyi | 363/54 |
| 5,402,058 | 3/1995 | Larsen | |
| 5,434,497 | 7/1995 | Larsen | 323/209 |
| 5,907,234 | 5/1999 | Sadek et al. | 323/210 |

FOREIGN PATENT DOCUMENTS

| | | |
|---|---|---|
| 0 159 522 | 12/1983 | Canada. |
| 0 037 087 A1 | 10/1981 | European Pat. Off.. |
| 0 116 275 A2 | 8/1984 | European Pat. Off.. |
| 3418065 A1 | 11/1985 | Germany. |

OTHER PUBLICATIONS

Proceedings of the Annual Power Electronics Specialist Conference, (PESC), San Antonio, Jun. 11–14, 1990, vol. 1, Jun. 11, 1990, Institute of Electrical and Electronics Engineers, pp. 309–317, A. M. Gole, et al., *Development of a State Variable–Based Static Compensator Model.*

*Primary Examiner*—Adolf Deneke Berhane
*Attorney, Agent, or Firm*—Kirschstein, et al.

[57] ABSTRACT

A polyphase thyristor-switched-capacitor static var compensator (SVC) arrangement employs a transformer circuit connected to the capacitors of the SVC and configured such that when the capacitors are switched out of circuit in sequence, a residual charge on the capacitors is reduced by the transfer of energy between the capacitor and an energy-dissipation circuit by way of the transformer circuit. The primaries of the transformer circuit are connected across respective capacitors, while the secondaries are connected in series in a delta configuration. Damping resistors may be connected in series with the primaries to help dissipate the capacitor energy. The transformer circuit may be saturable and may be constituted by individual transformers or one polyphase transformer. An alternative configuration applicable to a three-phase system employs a single-phase transformer having its primary connected across two series-connected capacitors of two of the phases, while its secondary is connected across the remaining capacitor.

14 Claims, 10 Drawing Sheets

Fig. 13.
(a)
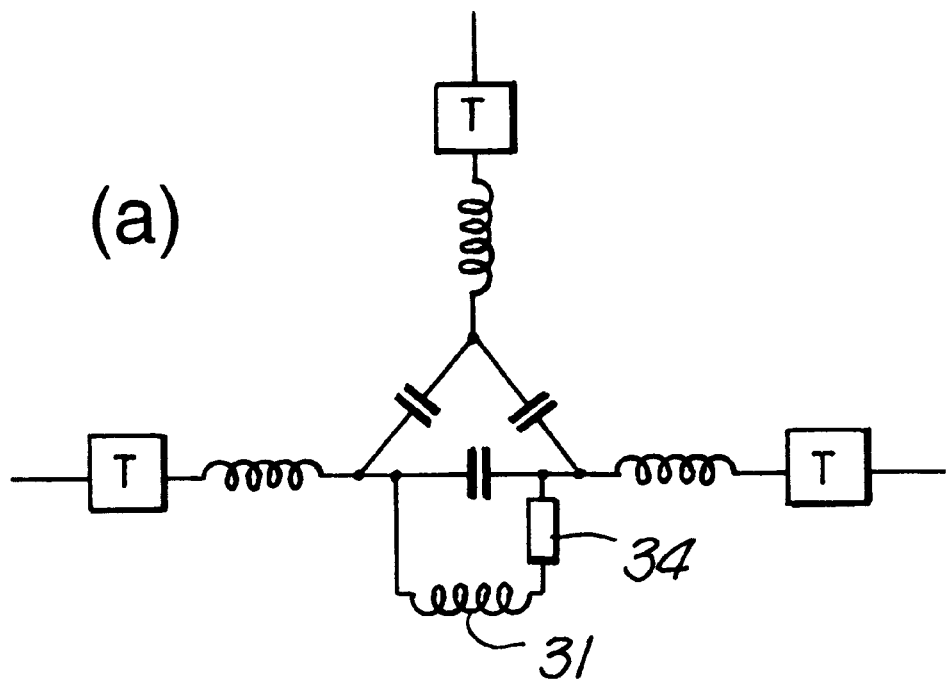
(b)
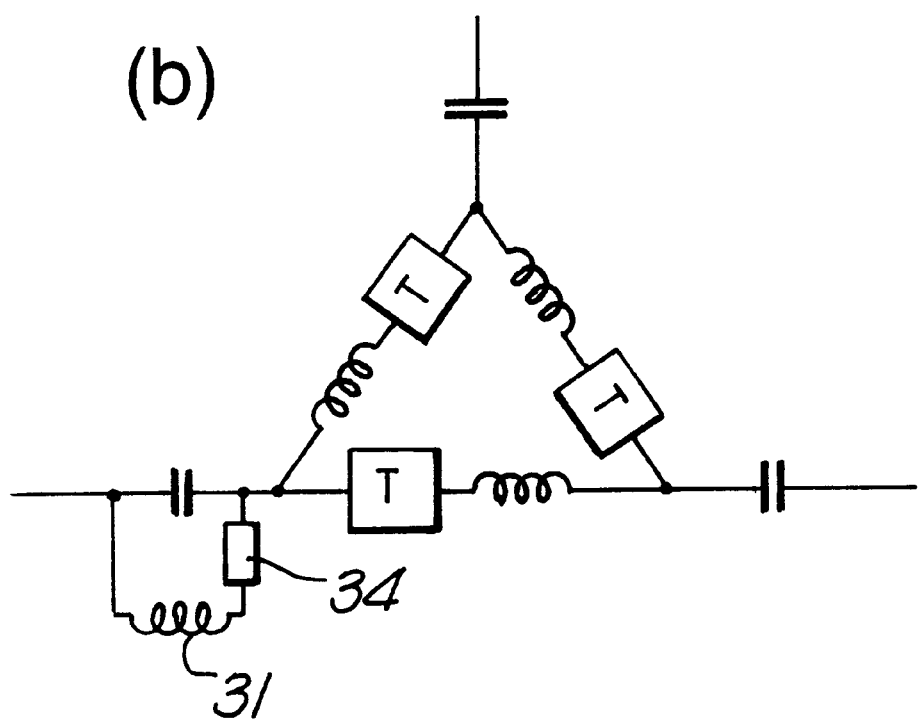

POLYPHASE STATIC VAR COMPENSATOR ARRANGEMENT FOR SUPPLY VOLTAGE REGULATION BY ENERGY DISSIPATION

BACKGROUND OF THE INVENTION

The invention relates to a polyphase static var compensator (SVC) arrangement for use in controlling vars and regulating the supply voltage in, for example, high-voltage supply systems.

Static var compensators are known in which a series circuit comprising a capacitor bank, a switch and a current-limiting or damping reactor is connected across the supply system, the switch being controlled to switch the capacitor bank into or out of circuit according to the demands of the system. Such a series circuit is shown in FIG. 1.

The energy levels involved m AC systems to which such circuits are connected often require the series circuits to take currents of thousands of amperes and the switches to withstand voltage levels of perhaps twenty thousand volts or more. Where, as is common, thyristor valves are employed as the switch, it is not presently possible to obtain thyristors individually rated for these conditions and consequently the switch comprises a thyristor valve assembly consisting of a number of thyristors in series and, in certain cases, a number of paths in parallel. Each series device or parallel group of devices is commonly referred to as a "level"). Thyristors of the type in question are expensive and it is desirable to limit the numbers as far as possible. However, it is essential that the thyristors be able to withstand the voltage levels that may arise during switching operations, which voltages may be considerably in excess of those obtaining in steady state conditions, especially as a result of the turn-off or blocking operation.

The series circuit illustrated in FIG. 1, which is known as a thyristor switched capacitor (TSC) circuit, may be connected between one phase V of, say, a three phase system and star-point/neutral N, as shown, or may be one arm of a delta arrangement connected between two phases. The capacitor C and thyristor valve T are the basic components, the reactor L being provided to limit the peak current and also the rate of change of current in normal turn-on and under fault conditions.

FIG. 1 shows the thyristor valve T as comprising a reverse-parallel pair of thyristors to provide conduction in both directions. When the switch is closed, a control means (not shown) provides gating pulses at 90° after the zero voltage crossings, so maintaining the thyristor valve in an unblocked (turned-on) condition. In this condition, as current falls to zero in one of the thyristors it is picked up smoothly in the other. A problem, however, arises when the thyristor valve is switched off (blocked). Referring to FIG. 2, the valve voltage is zero up to a time $T_1$, while the voltage drop across the capacitor is in phase with, but exceeds, the system voltage (V) by between about 5 and 13% to counteract the antiphase voltage across the reactor L.

At a suitable zero current transition, e.g. $T_1$, the thyristor valve is blocked. At this point the capacitor is fully charged, the charge is trapped and the capacitor voltage persists at its peak value as shown in FIG. 2 (negative upper electrode/ positive lower electrode). One half-cycle after the valve is blocked, the supply voltage reaches its positive peak value, the upper capacitor electrode is taken to the same voltage and the lower electrode is thereby driven excessively positive, to a value equal to the trapped capacitor voltage plus the supply voltage. This combined voltage on the lower electrode, amounting to more than twice the supply peak voltage, is applied across the thyristor valve which would, in the absence of any relieving facility, have to be rated accordingly. The resulting large excursions of the valve voltage are shown in FIG. 2.

FIG. 3 shows the basic TSC circuit of FIG. 1 employed in a three-phase delta configuration to provide an SVC coupled to an AC system for the control of, for example, system voltage. The delta-connected TSC arrangement 10 is fed from the line terminals of the secondary windings 11 (which are shown, purely for the sake of illusion, as delta-connected) of a transformer 12. The primary windings 13 of the transformer 12 are shown connected together at an earthed neutral point to forms again purely for the sake of example, a star connection to the AC system (not shown).

A mode of operation of the TSC arrangement of FIG. 3 during blocking is illustrated in FIG. 4. This diagram shows, in turn, waveforms for system AC voltage, current through the thyristor valves, voltage across the TSC capacitors (or capacitor banks) and voltage across the valves. At times $T_1$, $T_2$ and $T_3$, respectively, the valves for limbs ab, bc and ca may be switched off, i.e. blocked, again at zero-current points as shown in FIG. 2, and large voltage excursions appear across the valves as described in the single-phase case shown in FIG. 2. Other blocking sequences are possible which may affect the polarities, but not the magnitudes, of the trapped charge voltages.

An arrangement for reducing the voltage load on a thryistor switch in such a switched-capacitor compensator circuit is disclosed in EP-A-0 116 275, published Aug. 22, 1984. In this arrangement the capacitor of each phase of the compensator can be shunted by a resistor in series with an inductor or the winding of a transformer. When the capacitor is connected to an AC power system the inductor or transformer is unsaturated and presents a high impedance to the capacitor, whereas when the thyristor switch is opened the inductor or transformer is caused to go into saturation so that its reactance decreases and a large capacitor discharge current can then flow. The arrangement utilises separate, independently functioning discharge circuits for each phase.

The present application of the invention is directed to reducing the afore-mentioned undesirably large voltage excursions and preventing the thyristor valves having to hold off excessively high applied voltages in their blocked condition.

SUMMARY OF THE INVENTION

In accordance with a first aspect of the invention, there is provided a polyphase static var compensator arrangement comprising, for each phase, a capacitance means and, for at least each phase less one, a switching means in series with a respective said capacitance means, said compensator arrangement comprising transformer means and energy-dissipation means connected to said capacitance means, said transformer means and energy-dissipation means being arranged such that, when said capacitance means are switched out of circuit in sequence by their respective switching means, a residual charge on said capacitance means is reduced by a transfer of energy between said capacitance means and said energy-dissipation means by way of said transformer means, said capacitance means being coupled together by said transformer means.

The SVC will find most use in three-phase systems, though it can be employed in system of any number of phases; specifically, it is also applicable to two-phase and six-phase systems which are sometimes used in some areas.

The SVC may comprise a switching means for each phase of the system.

Assuming a three-phase system, said transformer means may comprise three first windings connected across respective capacitance means and three second windings connected in series with each other in a delta configuration.

The transformer means may comprise three separate cores or a common core. Alternatively, a three-limb core may be employed while dispensing with the second windings.

The first windings may be connected across respective said capacitance means by way of respective resistive elements, which then constitute part of the energy-dissipation means, bearing in mind that the windings themselves have resistance which play an energy-dissipation role.

In an alternative embodiment, two of the three capacitance means may be connected together at one end to form a series capacitor arrangement and said transformer means may comprise a first winding connected across said series capacitor arrangement and a second winding connected across the remaining capacitance means, the first and second windings sharing a common core.

The first and second windings may be connected across said capacitor arrangement and said remaining capacitance means, respectively, by way of respective resistive elements, which then constitute part of the energy-dissipation means, as mentioned previously.

The energy-dissipation means may be constituted wholly by a resistance of the windings of said transformer means.

The transformer means may comprise a saturable core or saturable cores.

The capacitance means may be each a part of a network of circuit elements in series with the respective switching means, said network serving the purpose of transient or harmonic suppression. The first windings may be connected across a part of respective networks which includes respective said capacitance means.

The compensator arrangement may be configured in a three-phase star configuration with its neutral point unconnected to a neutral point of the associated supply system, the compensator arrangement comprising, for two of said phases only, a switching means in series with respective said capacitance means.

BRIEF DESCRIPTION OF THE DRAWINGS

Embodiments of the invention will now be described, by way of example only, with reference to the drawings, of which.

DETAILED DESCRIPTION OF EMBODIMENTS OF THE INVENTION

Figure 3:
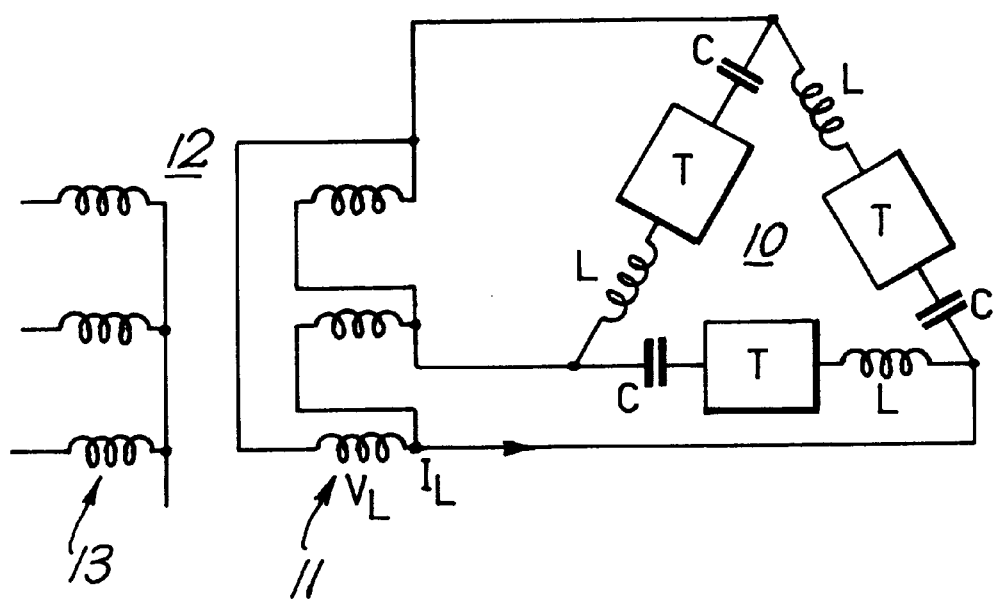
FIG. 3 is a circuit diagram of a known delta-connected thyristor-switched capacitor SVC arrangement.
Figure 2:
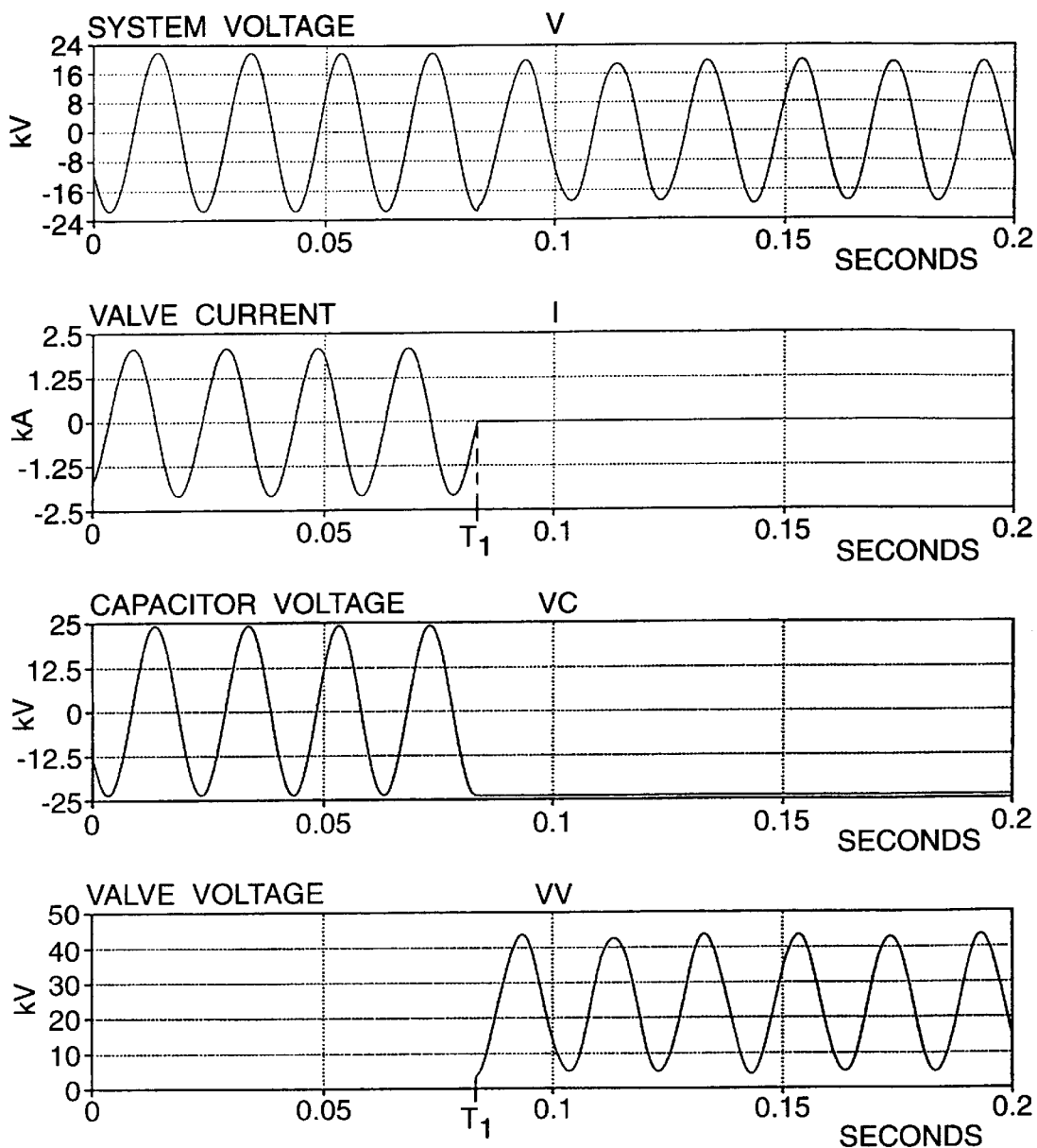
FIG. 2 is a graph of the voltages and currents in the circuit of FIG. 1 on blocking (turning off) the thyristor valve from a steady state.
Figure 5:
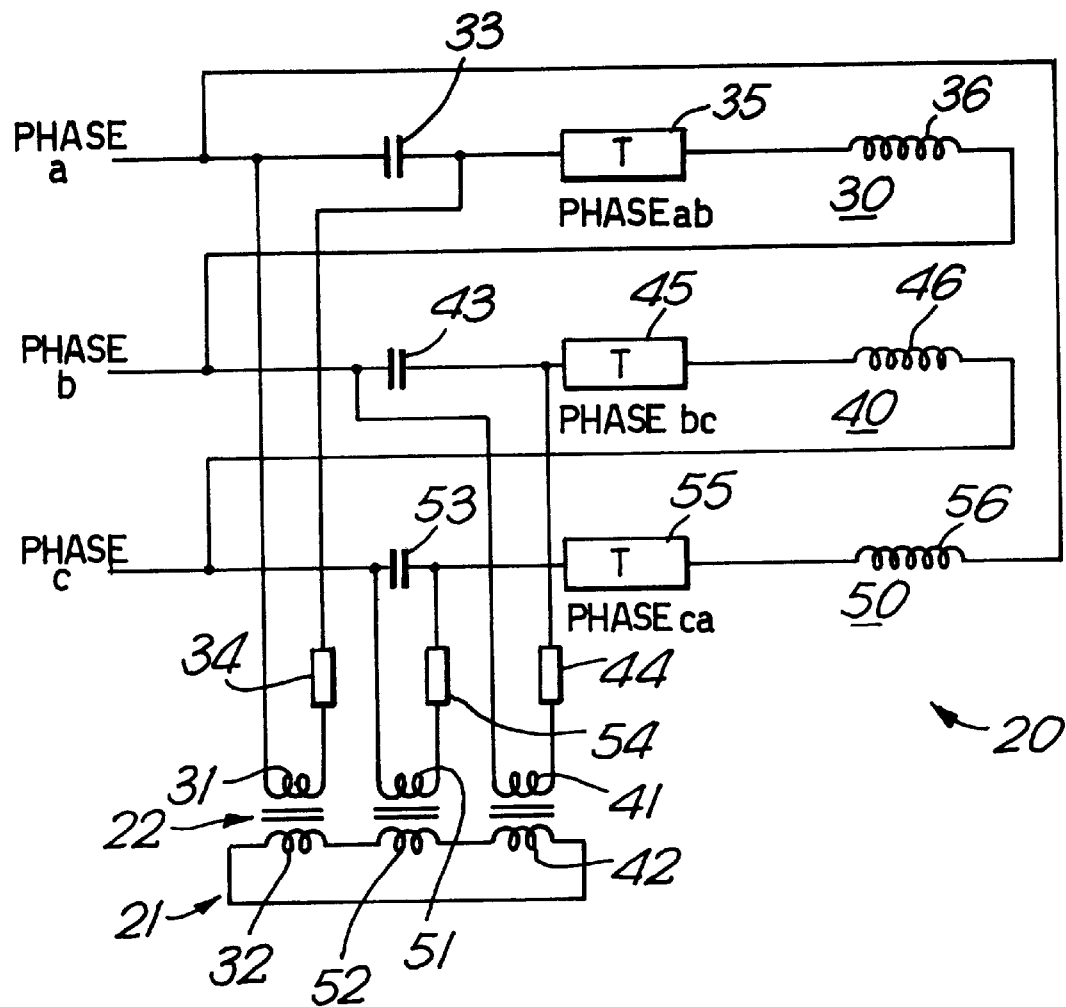
FIG. 5 is a circuit diagram of a delta-connected SVC arrangement in accordance with a first embodiment of the invention.

A first embodiment of the invention is shown in FIG. 5. In FIG. 5 a three-phase SVC 20 is configured as a delta-connected TSC, as in FIG. 3, but with the difference that three single-phase transformers 21 are included comprising three respective first windings 31, 41, 51 and three respective second windings 32, 42, 52 mounted on respective cores 22. The cores 22 are usually iron cores and, as such, are saturable.

Winding 31 is connected across a capacitor (which, as a capacitive element, may be a single capacitor or a bank of capacitors) 33 of the first TSC 30, winding 41 is connected across a capacitor 43 of the second TSC 40, and likewise winding 51 is connected across a capacitor 53 of the third TSC 50. Shunting of these capacitors by the first windings is by way of a series resistance 34, 44, 54.

Figure 1:
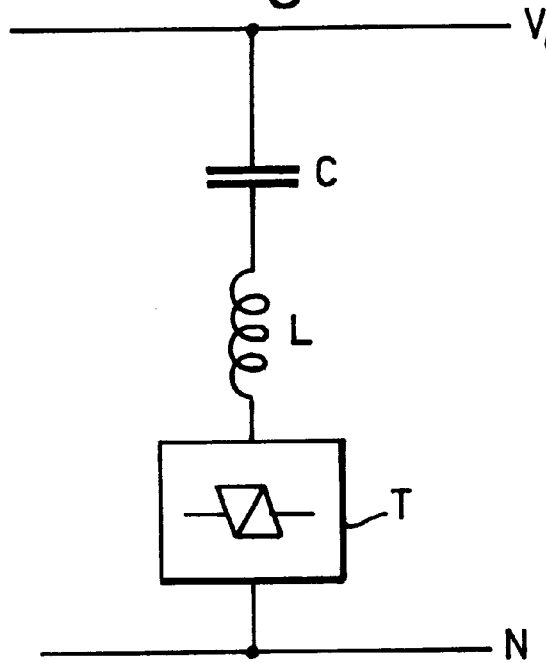
FIG. 1 is a diagram of the basic elements of a known series single-phase circuit comprising a capacitor, or bank of capacitors, a damping reactor and a thyristor valve assembly for switching the capacitor into or out of circuit.

The series TSC circuits 30, 40 and 50 are completed by the inclusion of a thyristor valve 35, 45, 55 and an inductance 36, 46, 56, as described for the basic arrangement of FIG. 1. The second windings 32, 42, 52 of the transformers 21 are connected in series and feed a short-circuit.

Figure 4:
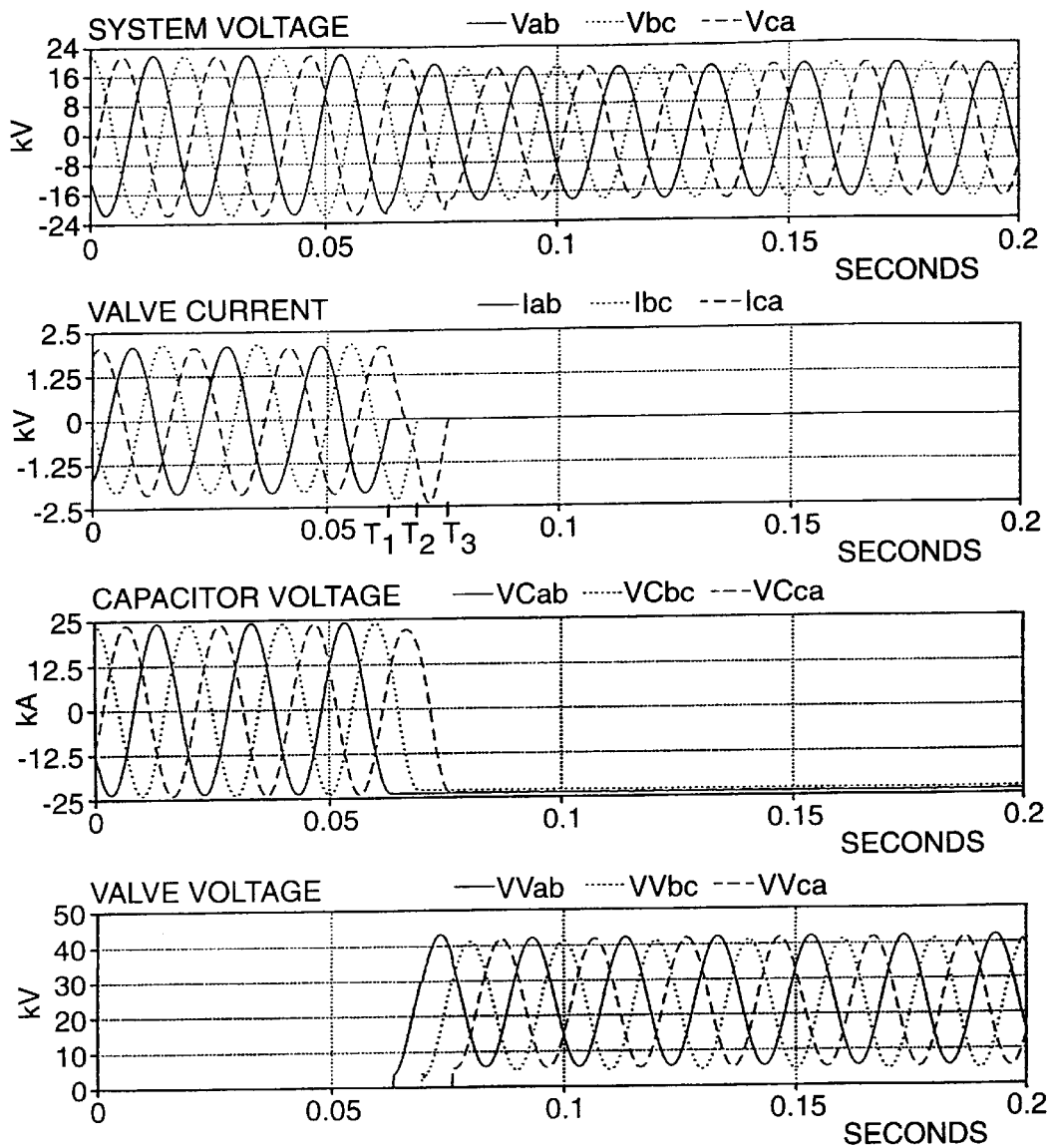
FIG. 4 is a graph of the voltages and currents in the circuit of FIG. 3 on blocking the thyristor valve from a steady state.
Figure 6:
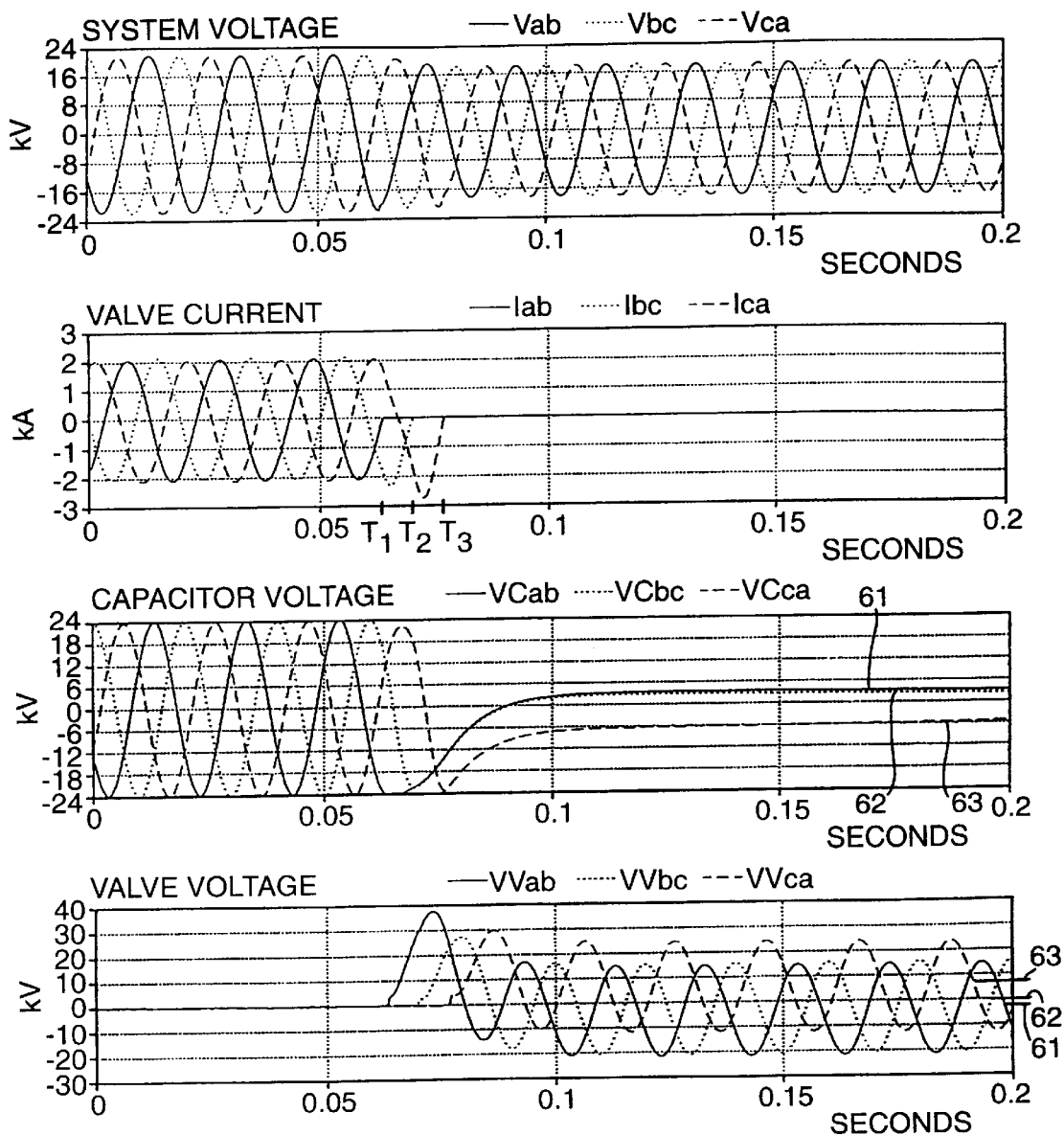
FIG. 6 is a graph of the voltages and currents in the circuit of FIG. 5 on blocking the thyristor valve from a steady state, assuming no saturation effects in the transformer means.

The fundamental behaviour of this SVC alignment is illustrated in FIG. 6. FIG. 6 shows waveforms of the same parameters covered by FIG. 4, namely system AC voltage, valve rent, capacitor voltage and valve voltage. Valve current is blocked for each phase in turn, preferably in a positive phase sequence, i.e. at time intervals corresponding to approximately ⅓ of one period at fundamental frequency (e.g. 50 Hz). These blocking times correspond to the ties $T_1$, $T_2$, $T_3$ shown in FIG. 4. (It should be appreciated that the thyristors could equally well be blocked as their current passes through zero from the negative current side, instead of the positive as shown in FIGS. 4 and 6).

Suppose that the three line-to-line voltages of the delta circuit of FIG. 5 are $V_1$, $V_2$ and $V_3$, where the suffices 1, 2 and 3 refer respectively to phases ab, bc and ca. The sum of these voltages is always zero, i.e.

$$\Sigma V = V_1 + V_2 + V_3 = 0 \tag{1}$$

Let the impedances of the three phases, i.e. the sum of the impedances of the individual components in each phase, be $Z_1$, $Z_2$, $Z_3$, respectively (for example, $Z_1$ will be comprised of the impedance of capacitor 33, inductor 36 and of valve 35 together with all busbars, interconnections and any other components).

The TSC circuit is usually designed to have matched impedance components, $Z_p$, in each phase. Thus:

$$Z_1 = Z_2 = Z_3 = Z_p \quad (2)$$

The current in each phase is correspondingly:

$$I_1 = \frac{V_1}{Z_1}, \, I_2 = \frac{V_2}{Z_2}, \, I_3 = \frac{V_3}{Z_3} \quad (3)$$

If the impedances of the capacitors are, respectively, $X_1$, $X_2$, $X_3$, then the voltages across these capacitors will be:

$$V_{C_1} = I_1 X_1, \, V_{C_2} = I_2 X_2, \, V_{C_3} = I_3 X_3$$

The sum of these capacitor voltages is, therefore:

$$\Sigma V_C = I_1 X_1 + I_2 X_2 + I_3 X_3 \quad (4)$$

From equations 2 and 3 and with $X_1 = X_2 = X_3 = X_c$:

$$\sum V_C = (I_1 + I_2 + I_3) X_C \quad (5)$$
$$= \frac{(V_1 + V_2 + V_3)}{Z_p} X_C$$

and from equation (1), $$\Sigma V_c = 0$$

In unblocked three-phase operation, therefore, the capacitor voltages are balanced and no current flows in the secondary windings 32, 42 and 52 or in the primary windings 31, 41 and 51. Thus the transformers are in a quiescent state.

When one phase, e.g. phase ab, of the delta-connected circuit is interrupted by the blocking of the associated thyristor valve 35 at time $T_1$, the voltage on the associated capacitor, capacitor 33, holds at its peak level and ceases to induce a voltage on the second winding 32 of the transformer 21. However, the other two capacitors are still passing alternating current at power frequency and so windings 42 and 52 continue to produce their normal AC sinusoidal voltages. These voltages appear in series across winding 32 and are reflected in the first winding 31. Consequently, capacitor 33 is subjected to a voltage which is approximately equal to the sum of the voltages on the capacitors in the other two phases. This voltage appears in such a sense as to tend to reduce the trapped charge voltage on the capacitor 33, thereby reducing the voltage appearing across the valve 35. This occurs by means of current flow from the capacitor 33 through the damping resistor 34 by way of the transformer winding 31, transformer action enforcing a corresponding current flow through resistors 44 and 54.

Clearly, because the voltages across capacitors 43, 53 are induced firstly into the second windings 42, 52 of the transformers associated with these capacitors, then re-induced via the second winding 32 back into the first winding 31 of the transformer associated with capacitor 33, the exact turns ratio of the first and second windings is immaterial, and any convenient ratio can be used.

A corresponding process of transformer action occurs following blocking of the valve 45 in phase bc of the SVC at time $T_2$. This time, the voltage across capacitor 53, which is still coupled across the AC system, is applied to, and shared between, capacitors 33 and 43 via the windings 51, 52, 32 and 42. Capacitors 33 and 43 discharge now at the same rate and current again flows through resistors 34, 44 and 54.

Figure 7:
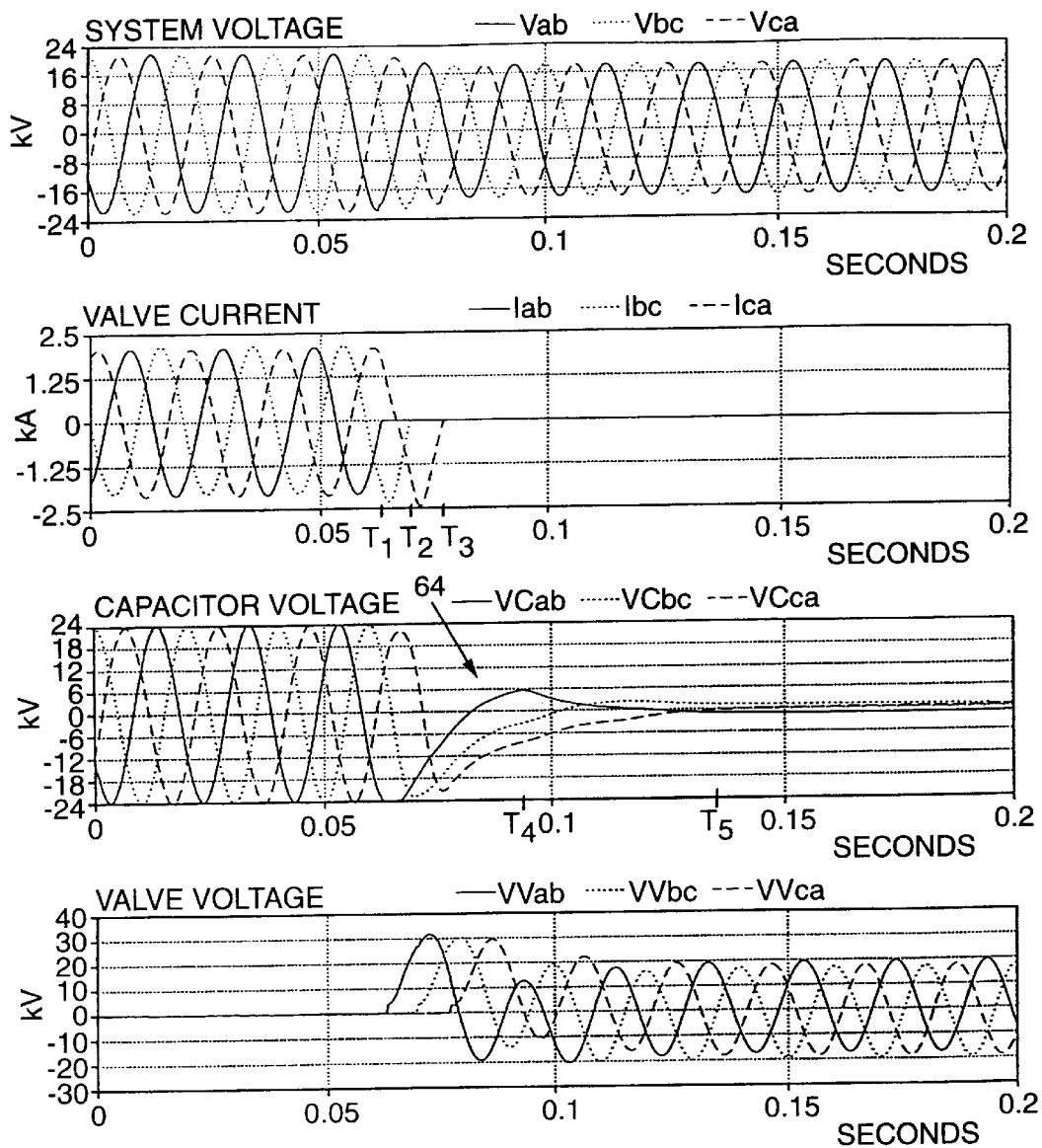
FIG. 7 is a graph of the voltages and currents in the circuit of FIG. 5 on blocking the thyristor valve from a steady state, assuming saturation of the transformer means.

At time $T_3$ the third valve 55 is blocked, upon which there occurs a final re-distribution of the remaining energy stored in the capacitors. This occurs by transformer and resistor-dissipation action as before, despite the fact that by this stage no sinusoidal voltage is present on any of the transformer windings. The finite rate of change of capacitor voltage necessary for transformer action to occur takes place here by virtue of the fact that the capacitors are discharging through the windings 31, 41, 51 via the resistances 34, 44, 54. Assuming the core of the transformer 21 does not saturate, the capacitor voltages settle as shown in FIG. 6, i.e. to some finite, normally non-zero, level which is different for each capacitor. It is clear that this final value is substantially less than the peak levels shown in FIG. 4. Valves 35 and 45 have both settled to a satisfactorily low offset 61 and 62. Valve 55 experiences the greatest offset of the three, 63; nevertheless it would be an advantage to reduce the offsets still further in the interest of optimum thyristor protection. This is achieved in the present invention by a process of saturation, as illustrated in FIG. 7.

As stated earlier, in practice the transformer cores are normally composed of iron, which is saturable. This means that the offsets still extant on the capacitors will ultimately cause the cores to state and the capacitors will discharge to zero residual trapped charge, i.e. zero offset. From FIG. 7 it can be seen that, for $t > T_1$, pure transformer action occurs in the first instance; start of saturation then enhances the rate of decay of voltage on the first capacitor (phase ab), providing the offsets 64 shown on the graph of capacitor voltage. Following this, the three cores go into further saturation at intervals, e.g. at $t = T_4$, and the offsets 64 decrease in a largely exponential manner until substantially zero offset is reached at a time $T_5$. Thus, the charge on the capacitors has been eliminated after a time period of around 50 ms, corresponding to 2½ cycles at the system frequency, following the final blocking operation.

The above-described effect of saturation is well documented in the art and is based on the fact that, when saturation occurs, the impedance of the transformer windings is decreased from a very high impedance, resulting from the high self-inductance of the transformers, to a very low impedance, resulting from the low self-inductance of the transformers. The latter is a function of the fact that, at saturation, the transformers have effectively an air core.

The transformers may be designed to have a very low reactance, in which case the capacitors may discharge in an oscillatory pattern of current pulses of alternating direction through the transformer windings, rather than in an exponential manner as described above. The selection of the value of this reactance together with the inductance of the supply system will control the frequency of the oscillatory discharge. The frequency may be made near to the supply frequency, which enables the voltage across the open switch to build up slowly over several cycles before reaching its maximum value of approximately twice the normal peak voltage of the supply. By introducing series resistance into the circuit (e.g. via the damping resistances 34, 44, 54), the decay of the energy in the capacitors can be made more rapid and the maximum voltage appearing across the switch can be reduced.

Achieving an oscillatory discharge at a suitably low frequency requires the use of very large transformers. It is therefore preferable to use smaller transformers with a much higher value of saturation reactance. A large damping resistance is then also preferable to ensure that the discharge is not oscillatory or, if it is oscillatory, that it is well damped. This is assumed to be the case in the arrangement pertaining to FIG. 7. The action of saturation assists, but is not essential to, the primary discharge action of the transformers and resistors.

Note that, instead of using three single-phase transformers it is also possible to employ one three-phase transformer with three core limbs around which are wound the respective first and second windings. It is also possible to employ a three-limb transformer which does not include the second windings because, when the transformer is unsated, the voltages across windings 31, 41 and 51 are kept equal to zero by the balancing of magnetic flux within the limbs.

Figure 8:
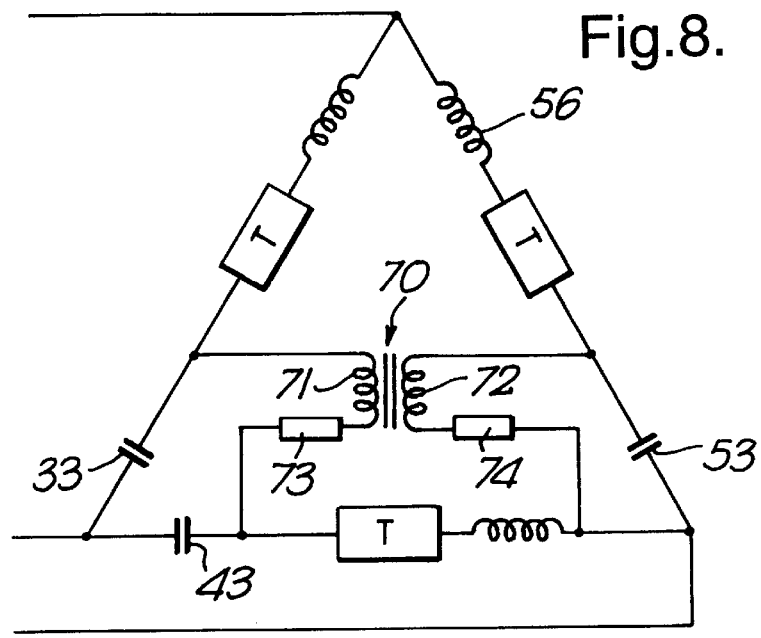
FIG. 8 is a circuit diagram of a delta-connected SVC arrangement in accordance with a second embodiment of the invention.

In a second embodiment of the invention (see FIG. 8), the transformer arrangement is simplified by arranging for the series disposition of the capacitor and reactor in one of the phases to be reversed with respect to the configuration in the other two phases. As shown in FIG. 8, capacitor 33 is arranged to be connected to the same node as the capacitor 43 instead of to the same node as the inductor 56. This creates a series capacitor circuit across which one winding 71 of a single-phase transformer 70 can be connected by way of a damping resistor 73. Similarly, a further winding 72 of the transformer 70 is connected via a resistor 74 across the capacitor 53. As was the case with the first embodiment involving a three-phase transformer, it may be advantageous to follow a positive sequence of blocking instructions to the valves in the tree phases of the SVC, though this is not essential.

The turns ratio of the two windings of this transformer should be substantially 1:1 in the normal arrangement of a three-phase TSC employing equal-impedance components in each phase.

Figure 9:
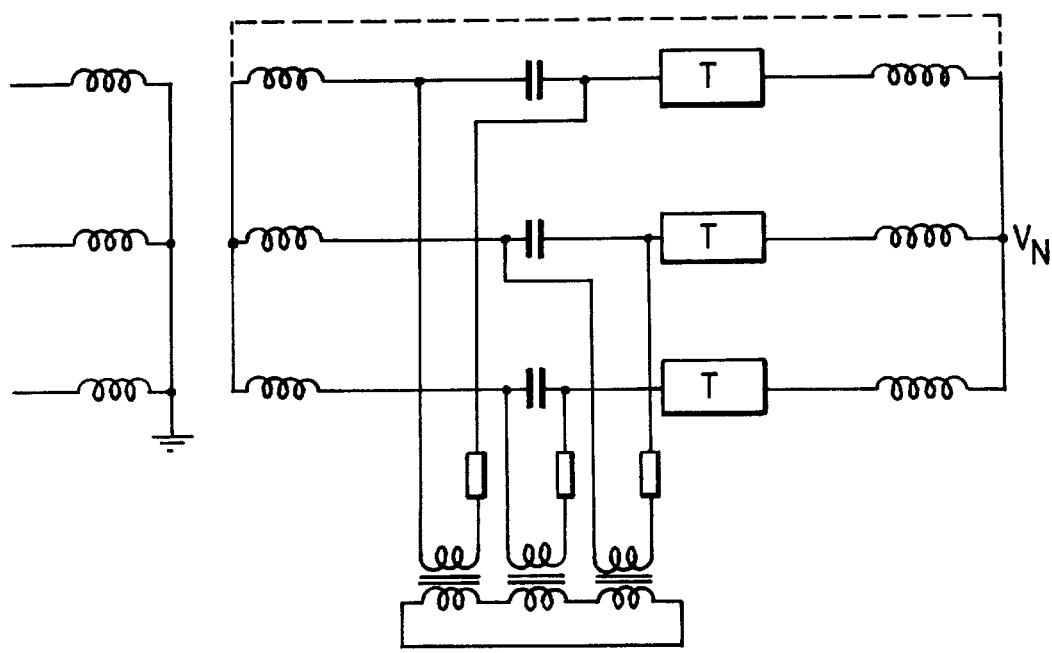
FIG. 9 is a circuit diagram of a thyristor-switched capacitor SVC arrangement in accordance with the invention employed in a star-connected configuration having a neutral point which is floating or non-floating with respect to the supply transformer.
Figure 10:
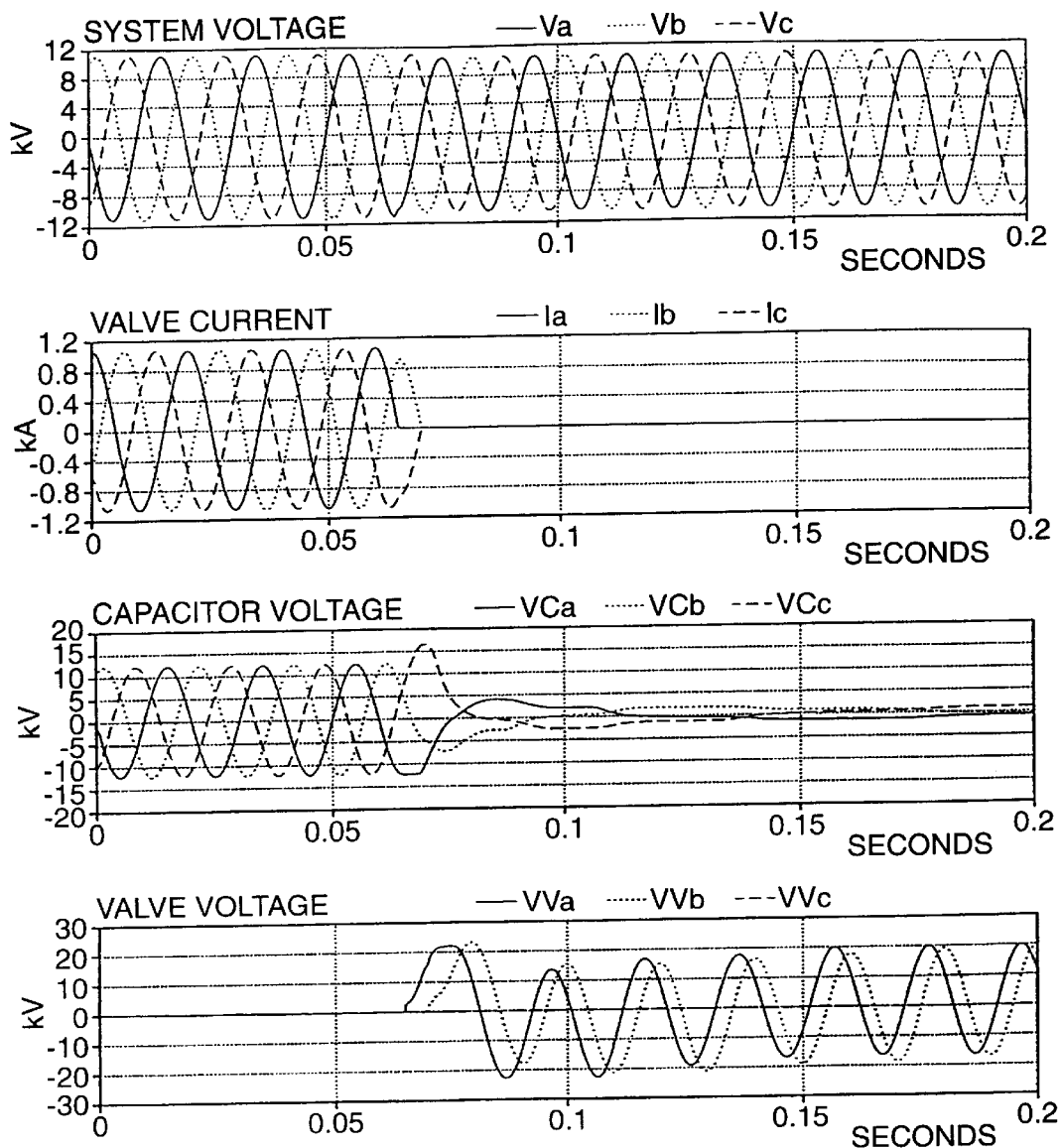
FIG. 10 is a graph of the voltages and currents in a floating-neutral star-connected SVC in which the thyristor valve is blocked from a steady state.

As well as a delta configuration of the SVC, it is possible to employ a star-connected configuration. This is depicted in FIG. 9. When the neutral connection $V_N$ is connected to the neutral of the system which supplies the SVC (i.e. the dotted connection shown in the diagram is made), the behaviour of this circuit is the same as that of the delta-connected circuit, such that the waveforms of FIG. 7 apply here also in all essential respects.

However, where the neutral connection of the SVC is not connected to a supply neutral but is allowed to float (the dotted connection in the diagram omitted), the behaviour is different. In this case, after the first valve has been blocked, the other two valves pass the same current, such that a substantially equal and opposite sinusoidal voltage appears across the remaining two capacitors (which are matched) and the sum of their voltages remains fixed This means that there can be no net contribution from these remaining capacitors in terms of a reflected sinusoidal signal to reduce the charge on the disconnected capacitor. After a short delay, the capacitor in question discharges through its associated first winding and series resistance due to saturation and transformer action will then transfer this voltage change to the other phases. The effectiveness of this process is dependent on the reactance and saturation characteristics of the transformer used and on the value of the damping resistances.

Because, following the first blocking operation in one limb, a common current flows in the other two limbs, subsequent blocking requires only the blocking of one of the remaining two valves, not of both at different times. This means that the thyristor valves in one of the limbs can be omitted without affecting the operation of the SVC.

Figure 11:
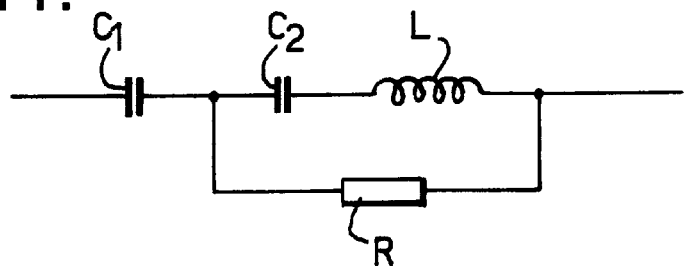
FIG. 11 is an alternative arrangement of capacitor, thyristor valve assembly and other damping circuit components, which may be used in the SVC arrangement according to the invention.

The SVCs of FIGS. 5 and 8 are based on the simple series circuit arrangement shown in FIG. 1. In practice other more complex arrangements may be employed, for example to reduce the amplitude of harmonic currents in the SVC. One such arrangement is shown in FIG. 11, in which the basic series configuration of capacitor C and inductor L (see FIG. 1) is replaced by a capacitor $C_1$ in series with an inductor L and a capacitor $C_1$, L and $C_2$ together being shunted by a resistance R. L in this arrangement has the same inductance value as in the basic arrangement of FIG. 1, and the series combination of $C_1$ and $C_2$ has the same capacitance value as C in the basic arrangement.

The relative values of $C_1$ and $C_2$ are usually chosen such that at power frequency, L and $C_2$ resonate and divert current away from resistor R. The current of the fundamental component is then controlled by the value of $C_1$ and the fundamental voltage across $C_1$ is the same as the voltage applied to the complete circuit.

At harmonic frequencies, however, and especially at the main harmonic frequency, the impedance of L is greater than that of $C_2$ so that R is no longer bypassed but is able to provide the required harmonic damping.

Figure 12:
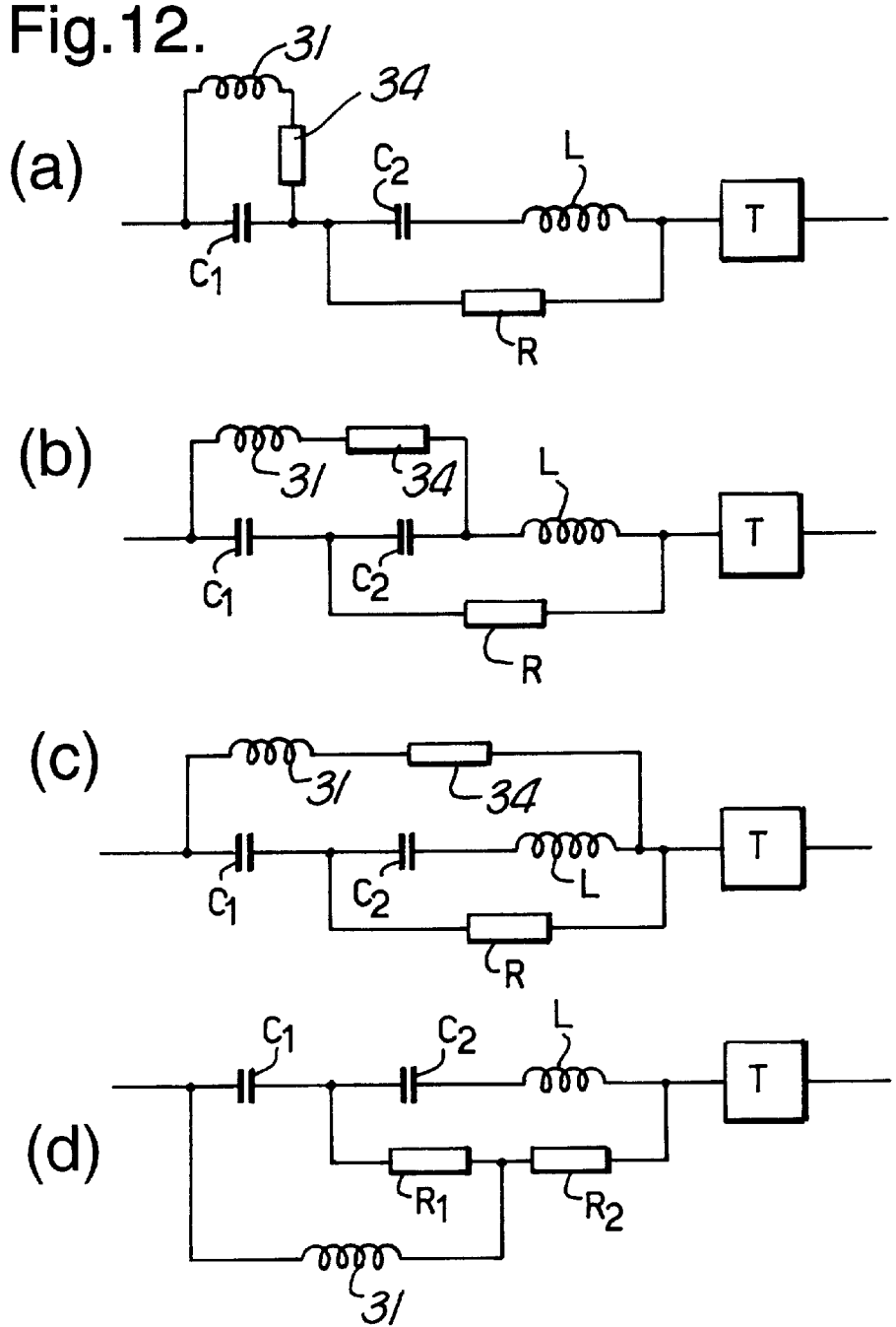
FIG. 12(a)–(d) shows possible ways of connecting the transformer means of the SVC according to the invention to the series circuit illustrated in FIG. 11, and FIG. 13(a) & (b) illustrates two alternative three-phase configurations which may be used in the SVC arrangement according to the invention.

Various points of connection may be considered for the discharge transformer 21 and resistors 34, 44 and 54. For example, referring now to FIG. 12, the first winding 31 of the first phase, for example, may be connected by way of the dissipation resistor 34 directly across C1 (FIG. 12(a)), or across the series combination of and (FIG. 12(b)), or across the whole series combination of $C_1$, $C_2$ and L (FIG. 12(c)). In FIG. 12(d) an arrangement is shown in which the resistor R is split into two series resistors $R_1$ and $R_2$, $R_1$ then fulfilling the function of dissipation resistor, while at the same time acting to reduce the harmonic distortion in the system. The function of resistor 34 in the other three arrangements of FIG. 12 is thus replaced by $R_1$.

Other three-phase SVC configurations than the simple delta (FIG. 5) and star (FIG. 9) arrangements are possible. FIG. 13 shows two alternative configurations in which the basic form of series circuit shown in FIG. 1 is used; however, it should be appreciated that developments of the basic circuit exemplified by FIG. 11 could also be employed. In FIG. 13(a) the capacitors of the SVC are connected to each other in a delta arrangement with the inductors and thyristor valves of each phase being connected to respective nodes of the delta arrangement. The first windings and dissipation resistors are then connected directly across the respective capacitors (only one such first winding 31 and resistor 34 is shown).

FIG. 13(b) illustrates a second possibility which is essentially the reverse of the first, i.e. the inductor/thyristor-valve part of each series circuit is connected in delta, while the capacitors are connected to respective nodes of that delta arrangement. The first windings (e.g. 31) and associated dissipation resistors (e.g. 34) are connected across respective capacitors, as before.

The described technique of employing transformer action to reduce trapped charge on the capacitors of a three-phase TSC is also applicable to arrangements using mechanical switches instead of thyristors. In this case, reduction of the voltage stress to which the switches are subjected has the advantage of reducing the risk of restrikes in the switch mechanism.

It should also be appreciated that it may not be necessary to include resistors in series with the first windings of the transformer or transformers where the latter already have adequate resistance to dissipate the energy stored in the capacitors during blocking.

What is claimed is:

1. A polyphase static var compensator arrangement for supply voltage regulation in a voltage supply system, comprising:
   a) a plurality of capacitors, each capacitor being provided for each of a plurality of phases;
   b) a number of switches being respectively connected in series with a corresponding number of capacitors in a corresponding number of phases, said number of switches being no less than one smaller in number than said plurality of phases;
   c) a transformer electrically coupled to the capacitors for transferring energy away from the capacitors;
   d) an energy-dissipator operatively associated with the transformer, for dissipating the energy; and
   e) the switches being operative for sequentially switching their respectively connected capacitors out of the system, and for discharging the energy from the capacitors through the transformer to the energy-dissipator.

2. The static var compensator arrangement as claimed in claim 1, in which there are three phases.

3. The static var compensator arrangement as claimed in claim 2, in which said number of switches is equal in number to said plurality of phases.

4. The static var compensator arrangement as claimed in claim 2, in which said transformer includes three first windings connected across three respective capacitors, and three second windings connected in series with each other in a delta configuration.

5. The static var compensator arrangement as claimed in claim 4, in which said transformer includes three separate cores.

6. The static var compensator arrangement as claimed in claim 4, in which said transformer includes a common core.

7. The static var compensator arrangement as claimed in claim 2, in which said transformer includes three first windings wound on respective limbs of a three-limb core and connected across three respective capacitors.

8. The static var compensator arrangement as claimed in claim 4, in which said energy-dissipator includes three resistors, and in which the three first windings are connected across the three respective capacitors by way of the three respective resistors.

9. The static var compensator arrangement as claimed in claim 3, in which two of the plurality of capacitors are connected together at one end to form a series capacitor arrangement, and in which said transformer includes a first winding connected across said series capacitor arrangement and a second winding connected across another of the plurality of capacitors, the first and second windings sharing a common core.

10. The static var compensator arrangement as claimed in claim 9, in which said energy-dissipator includes resistors, and in which the first and second windings are connected across said series capacitor arrangement and said another capacitor, respectively, by way of respective said resistors.

11. The static var compensator arrangement as claimed in claim 4, in which said energy-dissipator is constituted by a resistance of the windings of said transformer.

12. The static var compensator arrangement as claimed in claim 1, in which said transformer includes at least one saturable core.

13. The static var compensator arrangement as claimed in claim 1, in which said transformer and energy-dissipator are connected to said capacitors by way of respective networks which include respective said capacitors.

14. The static var compensator arrangement as claimed in claim 2, in which the phases are configured in a star configuration with its neutral point unconnected to a neutral point of the supply system, the compensator arrangement comprising, for two of said phases only, two of said switches in series with respective two of said capacitors.

* * * * *